United States Patent [19]
Keller

[11] Patent Number: 6,123,482
[45] Date of Patent: Sep. 26, 2000

[54] CROSS-CONNECTORS FOR TUBULAR MEMBERS FORMING FRAMEWORKS

[76] Inventor: Richard D. Keller, 6416 Fourth Ave., Takoma Park, Md. 20912

[21] Appl. No.: 09/131,794

[22] Filed: Aug. 10, 1998

Related U.S. Application Data

[63] Continuation-in-part of application No. 08/701,872, Aug. 23, 1996, Pat. No. 5,797,697.
[51] Int. Cl.[7] ...................................................... F16B 2/08
[52] U.S. Cl. ....................... 403/384; 403/290; 403/374.3; 403/389
[58] Field of Search ................................. 403/373, 374.1, 403/374.2, 374.3, 289, 290, 384, 385, 389, 395, 396, 392, 344; 411/389, 388; 248/74.1, 74.3, 229.2, 230.8

[56] References Cited

U.S. PATENT DOCUMENTS

| | | | |
|---|---|---|---|
| 575,631 | 1/1897 | Brooks | 403/389 X |
| 2,122,868 | 7/1938 | Morgan | 403/290 |
| 2,205,474 | 6/1940 | Goeller | 403/373 |
| 3,923,409 | 12/1975 | Stoner | 403/373 X |
| 4,269,445 | 5/1981 | Gager, Jr. | 403/373 X |
| 4,772,153 | 9/1988 | Huang | 403/344 |
| 5,059,053 | 10/1991 | Rose | 403/373 X |
| 5,797,697 | 8/1998 | Keller | 403/384 |

*Primary Examiner*—Harry C. Kim
*Attorney, Agent, or Firm*—A. R. Eglington

[57] ABSTRACT

An interruptible connector assembly adapted for the interlocking spatially of one tubular member with another object to be supported thereby, comprising: flexible clamping members adapted to be deformed into a U-shape and overlap any underlying planar surfaces; a single component, rigid support means, with each and having a proximal structurally identical arcuate component each end, such opposing arcuate surfaces adapted to nest a tubular member; a linear bore hole traversing of each of said gripping components; spherically faced cylindrical bushings, to slidingly engage the bore hole of its associated gripping component and each having at its shoulder contacting the adjacent support means; an elongate, assembly fastener means to slidingly traverse the aligned assembly via the component bore holes, being of a length sufficient to extend from one external side of the assembly to the other external side about the interlocked tubings. In a second embodiment, two of the above-described clamps are conjoined axially to interconnect two or more tubular members in any one of several angles. In both embodiments, the elongate bolt is provided with an integral collar projecting radially and located proximal to one longitudinal end, serving as a retaining wall for end-mounted accessories.

14 Claims, 13 Drawing Sheets

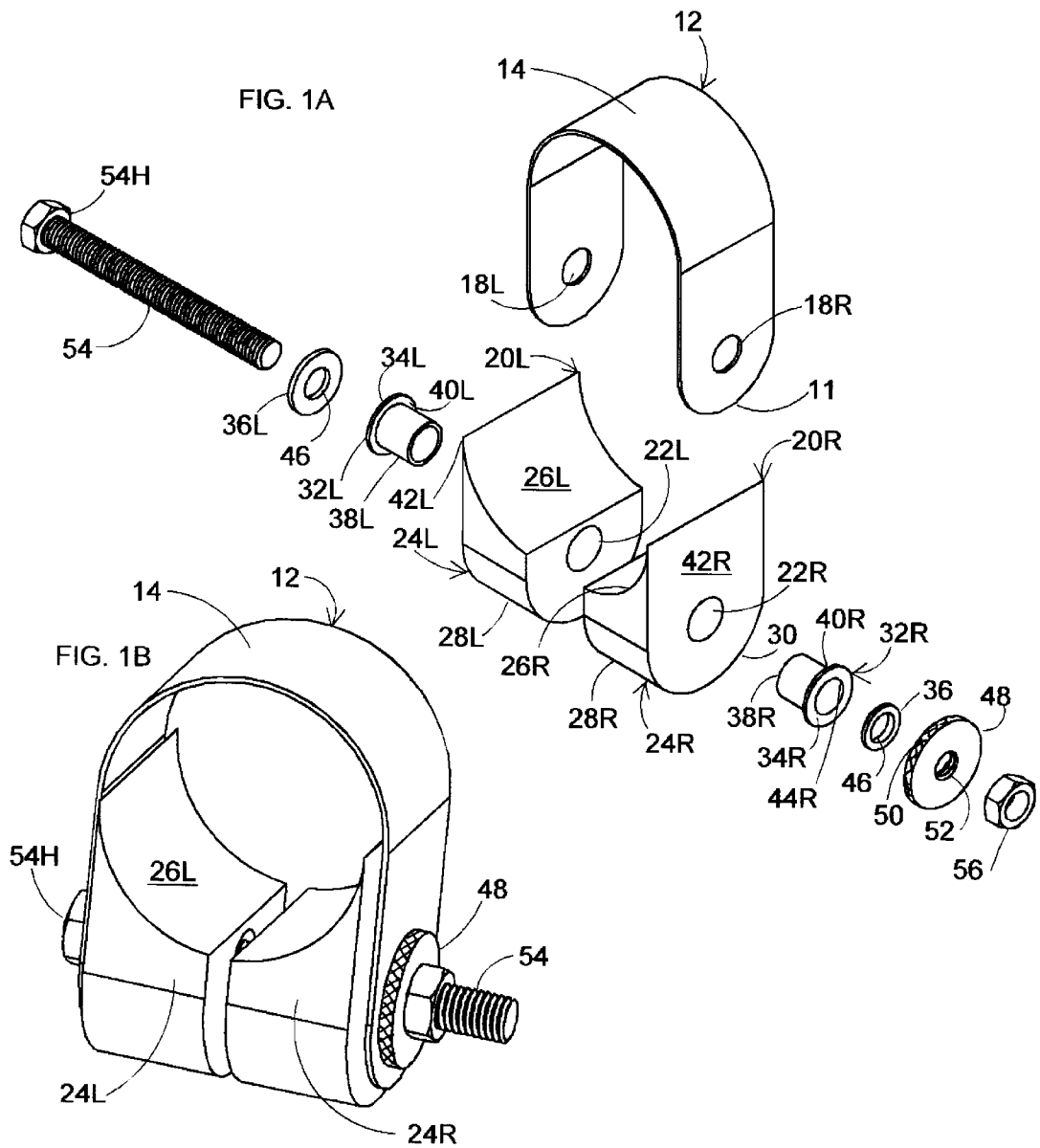

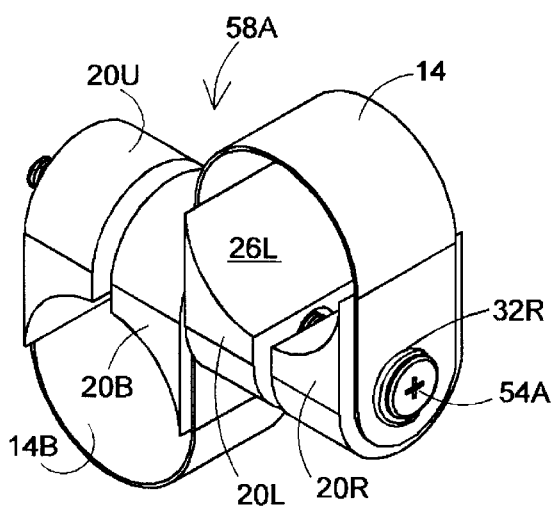
FIG. 3 OFF
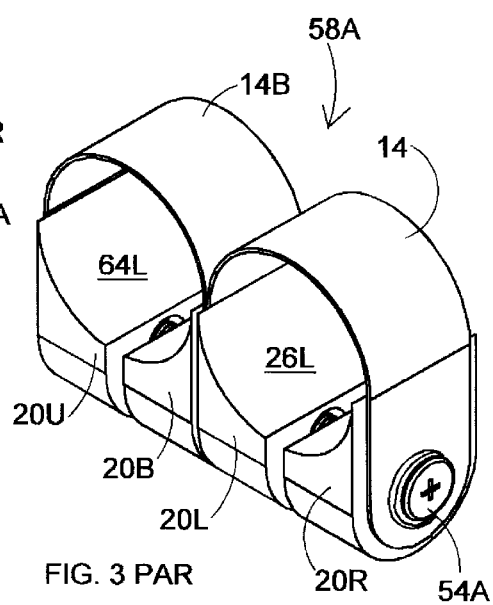
FIG. 3 PAR
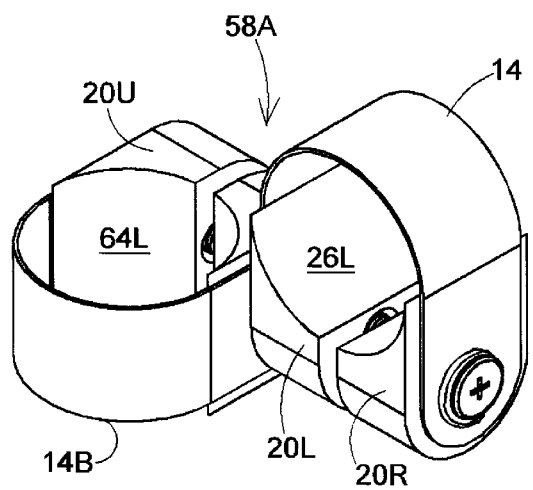
FIG. 3 RTA
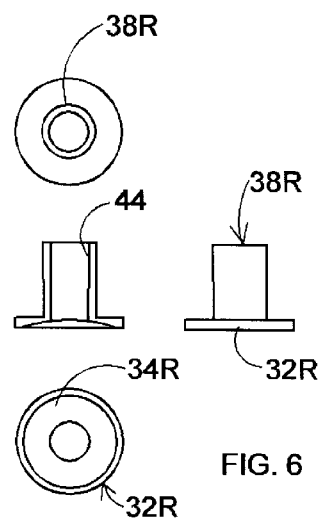
FIG. 6

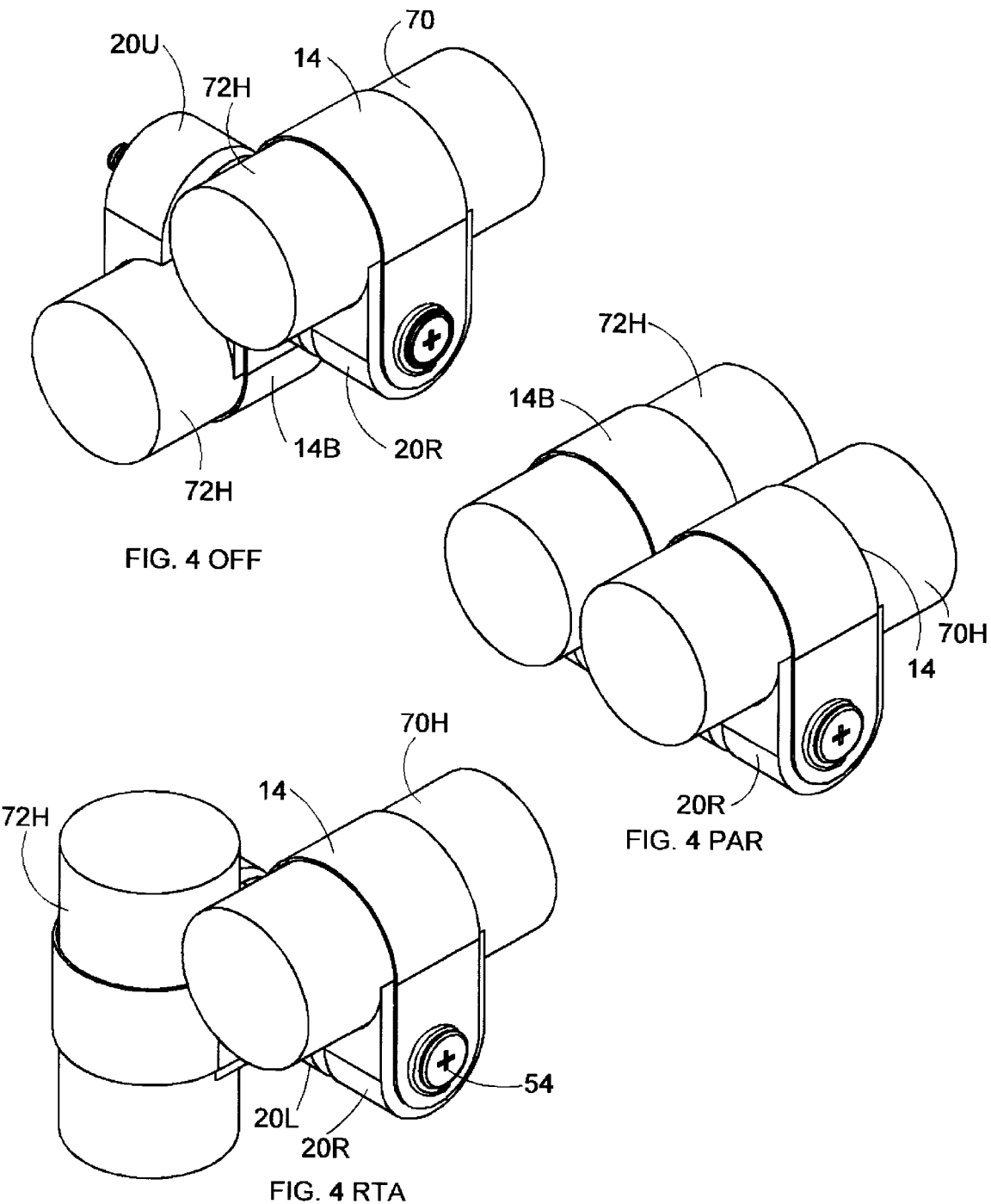
FIG. 4 OFF
FIG. 4 PAR
FIG. 4 RTA

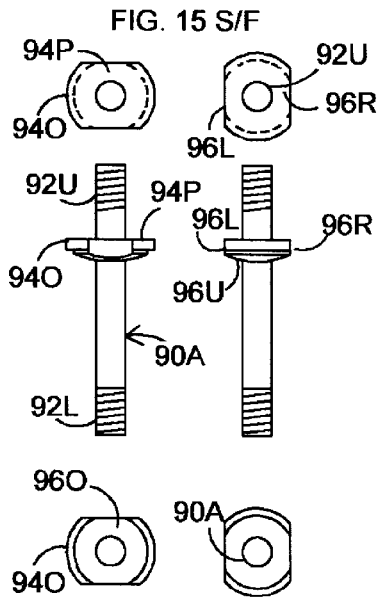
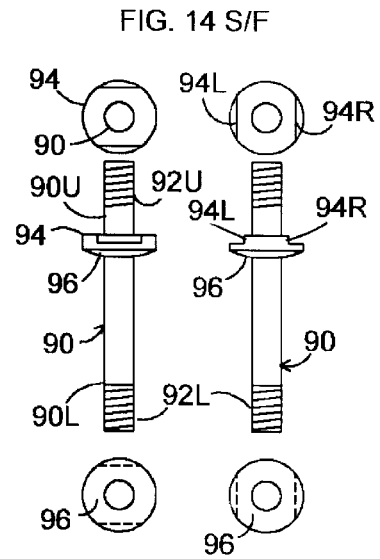
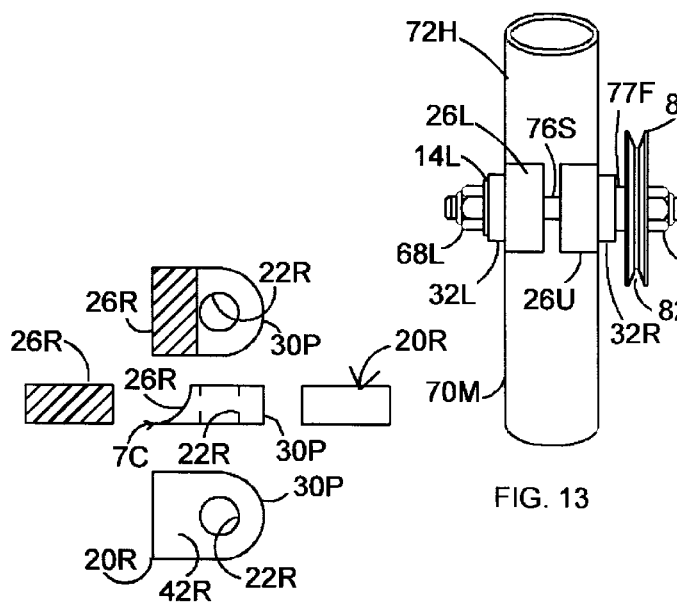
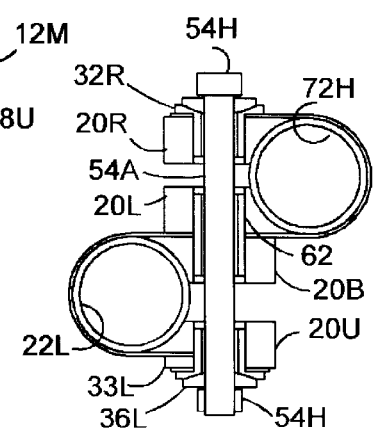

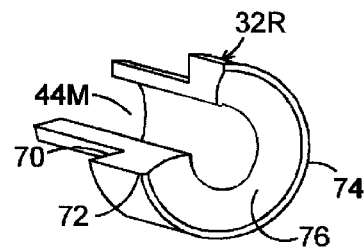
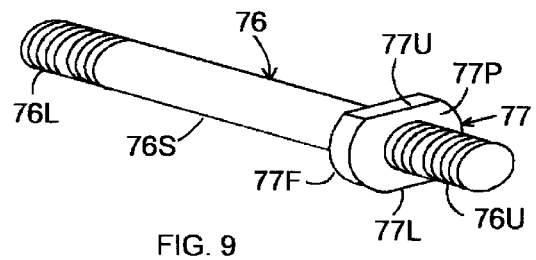
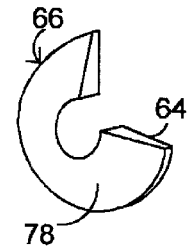
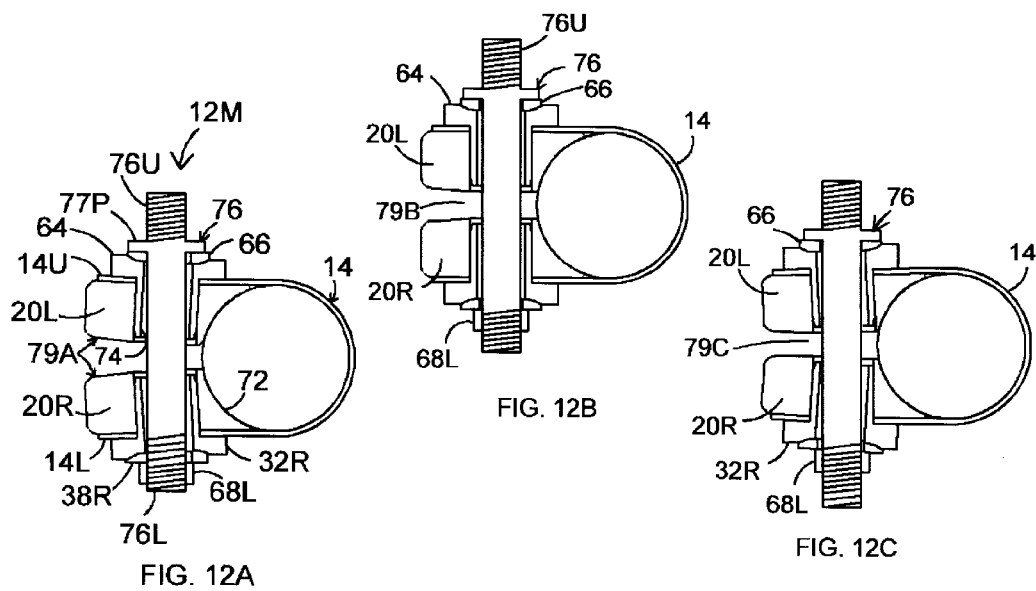

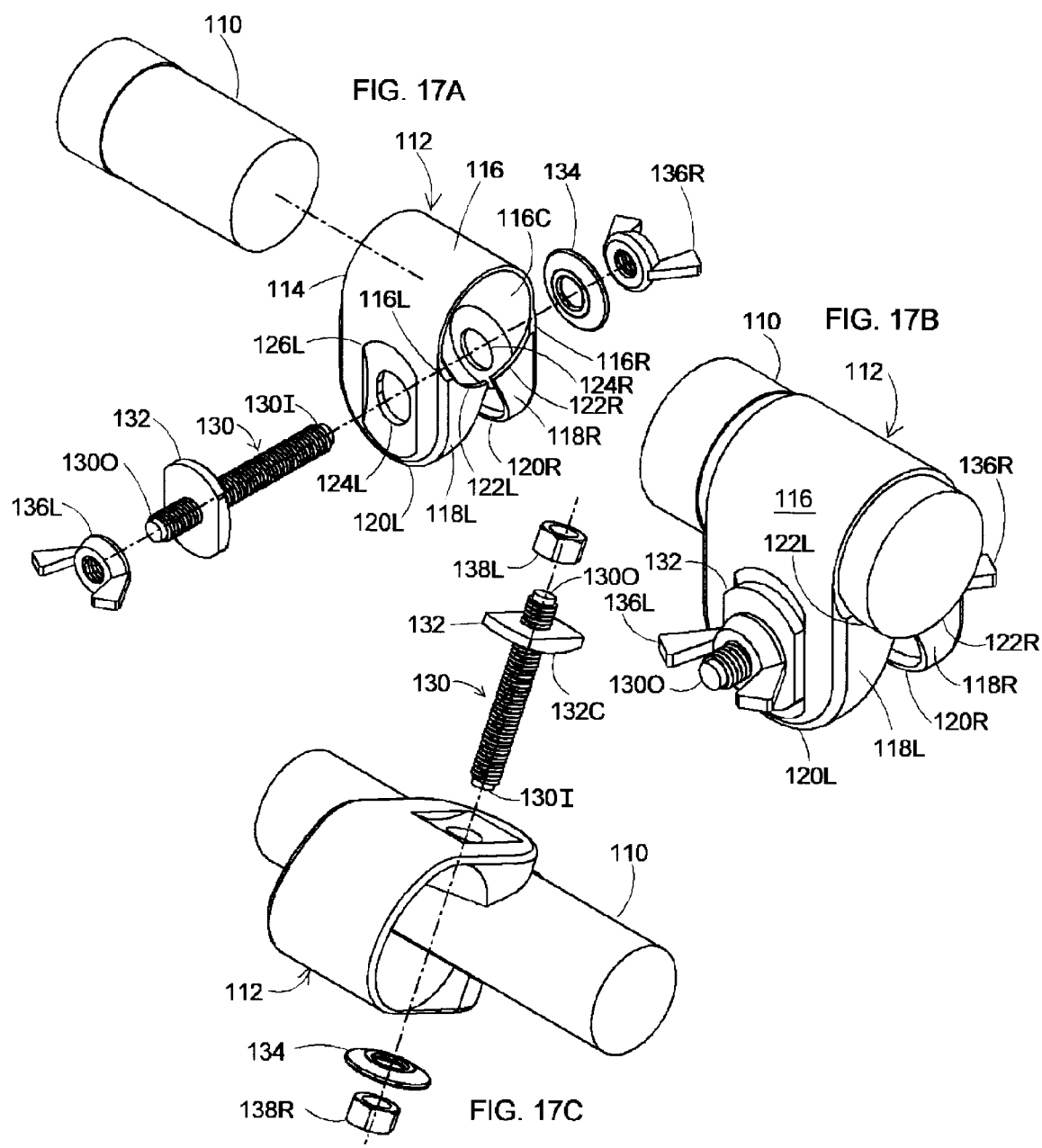

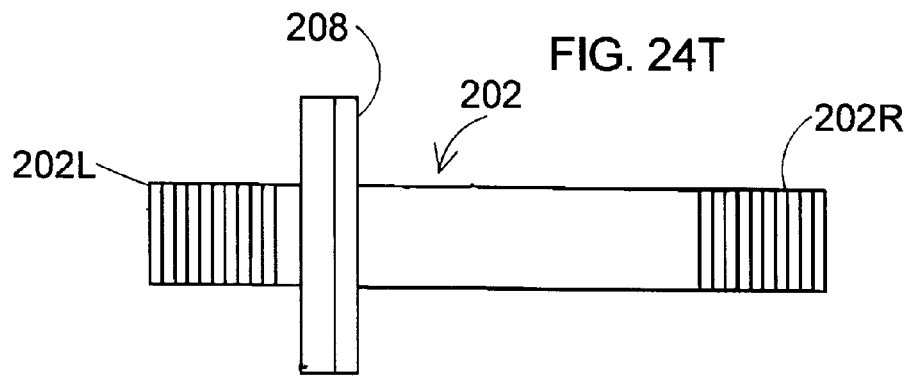
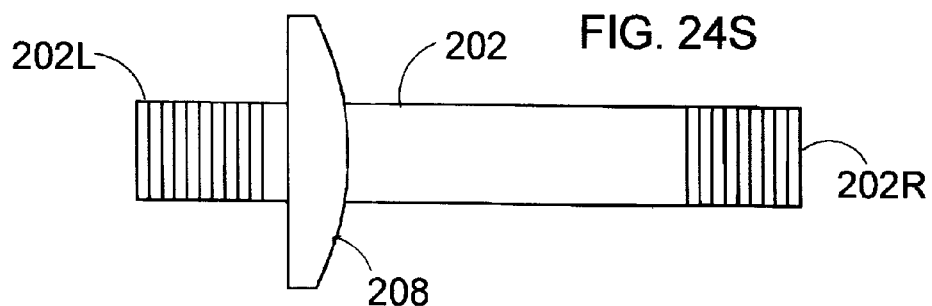
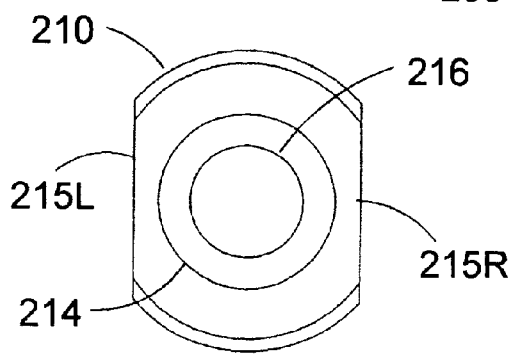
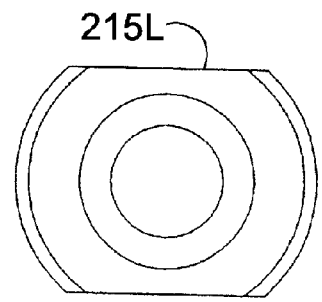
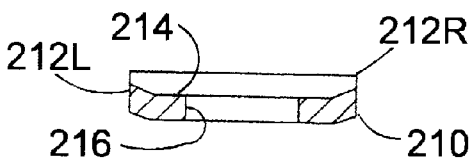
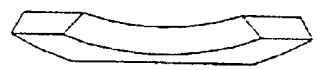
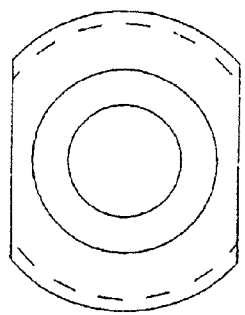

CROSS-CONNECTORS FOR TUBULAR MEMBERS FORMING FRAMEWORKS

CROSS-REFERENCE TO OTHER APPLICATIONS

This is a continuation-in-part of my application, identical title, U.S. Ser. No. 08/701,872, filed Aug. 23, 1996, now allowed as U.S. Pat. No. 5,797,697, issued Aug. 25, 1998.

TECHNICAL FIELD OF THE INVENTION

This invention relates to clamps such as are used for securing elongate members to one another or to another fixture. In another aspect, it relates to a cross-over dual clamping assembly adapted for linear tubular members that intersect at variable angles.

BACKGROUND OF THE INVENTION

Tubular members for erecting a variety of structures range from bridges, airplane frames, railings, boats, bicycle, motorcycle and automobile frames, wheelchairs, and even erector sets (toys) are known for decades. One practical aspect of these structures are the critical choice of connectors that fix and hold the juxtaposition of one tubular member relative to another.

The tubular structure itself is not any more sturdy than its weakest link, mainly, the connector assembly being used. As a result, complex and costly fabricated connectors are often required which, if properly installed, ensure the reliability of the erected framework over time.

A cleating device involving a flexible clamp for a cylindrical cable is disclosed in U.S. Pat. No. 5,482,234 (Jan. 9, 1996 to one R. C. Lyon). A device serving as a cross-connector for two crossing tubular members is described in U.S. Pat. No. 4,817,897 (Apr. 4, 1989 to one Ulrich Kreusel). Other relevant teachings are Brooks U.S. Pat. No. 575,631 (1997), Hefner U.S. Pat. No. 2,872,141 (February, 1959); and Kahler U.S. Pat. No. 1,046,600 (1912).

Available connectors are often only adapted to provide right angle joining or connection between tubular members lacking any angular options, as are sometimes required. Available connectors lack the versatility to connect other non-(cylindrical) tubular, shared accessories. Available connectors also offer no means of adjustment lengthwise down a tube and around its circumference. Currently, available connectors provide no accurate self-realignment property to provide flush mating surfaces for the connecting nut and bolt heads as well as flush mounting of accessories. Also, being somewhat complex to assure sturdiness, they are costly to use, thusly may limit the applications where tubular members could provide an extensive support structure.

OBJECTS OF THE INVENTION

It is a principal object of the invention to provide a clamping assembly for connecting cylindrical, and tubular members to other members which is lightweight, fairly economical to fabricate, and is flexible as to all angular arrangements and as to the shape of such members to be clamped together.

It is another object of the invention to provide a cross-over connector for tubular members that is facile to manipulate onto tubing, consists of a limited number of component parts, and permits rapid exertion of the manual force needed to clamp the members firmly together.

In still another embodiment, the invention provides a clamping assembly or two member that cross over each other at any one of several desired angles.

A yet further object of the invention is to provide a mono- and/or dual-clamping assembly, which serves a range of tubular member diameters, that can be effectively interconnected by a feature to be described herein.

The features, advantages and benefits of the present invention will become more evident upon study of the appended of the appended specification, drawing and claims.

ADVANTAGES OF THE INVENTION

The clamping assembly provides a large tubing contact area for extra firm gripping and a unibolt component that allows for easy mating and rotating adjustment around, and along, the tubing length.

The floating bolting position accommodates small dimensional variations in tubing due to temperature-induced and manufacturing variations in dimensions.

The employment of a durable material of fabrication allows/provides substantial structural strength and corrosion resistance in outdoor usage.

The assembly components allow for light-to-heavy duty use in both English and metric sized tubular membering structures.

The angles between interconnected tubings (even of differing diameters) can be varied widely, ranging from parallel (both adjacent and offset spatially), at acute angles and at substantially right angles.

SUMMARY OF THE INVENTION

In one embodiment, the invention resides in a single clamp assembly, that is adapted to be secured to one (lone) tubular member, which is to further provide a modest platform for securing another object to the tubular member, such as a pulley, cable end point, mounting platform, stop of some kind, connecting point, that is to be securely appended to tubular member. The mounting platform may be no more than an oversized take-up washer optionally with a knurled periphery; which is first set in the intended position and fixed there with a terminal lock-nut.

The assembly comprises a flexible clamp band adapted to be deformed into a U-shape, and to overlap any underlying planar surfaces positioned there between; and, with such each band bearing a transverse perforation proximal to each longitudinal end; a two-component, rigid tube support means, with each structurally identical component presenting a generally planar outer surface, and having an at least partially arcuate surface proximal one end of a generally planar inner surface, such opposing arcuate surfaces adapted to nest a tubular member; a bore hole traversing the non-arcuate lateral planar surfaces of each of said clamping components; two spherically-faced flange, cylindrical bushings, each having one longitudinal end of reduced diameter, sized to engage freely the bore hole of its associated support means, and each having its other longitudinal end forming an inner flanged shoulder for contacting the planar outer surface of the adjacent support means; two washers, each having an axial bore hole sized to match the diameter of its fastener means; and each face of one side of the washer spherically-faced to match the flanged bushing face. and, an elongate, assembly fastener means of a diameter sized to traverse the aligned assembly of several component bore holes, and also being of a length sufficient to extend from one lateral side of the assembly to the other lateral side, while still leaving a free end projection adapted to engage a removable locking means.

In another embodiment, the invention resides in a dual clamp assembly adapted to be the interconnection, for two tubular members as part of a framework, either disposable at right angles, at acute angles, laterally offset, or parallel in one plane to each other, while in use. This assembly comprises a first flexible clamp band adapted to be deformed into a U-shape, and serving to overlap any underlying planar surfaces, with each band bearing a transverse perforation proximal to each longitudinal end; a first two-component, rigid tube support means, with each structurally identical component presenting a generally planar outer surface, and having an at least partially arcuate surface proximal one end of a generally planar inner surface, such opposing arcuate surfaces adapted to nest a tubular member; a linear bore hole traversing the non-arcuate lateral planar surfaces of each pair of the support means; a second flexible clamping band similarly adapted to be deformed to overlap a second set of underlying surfaces, and also having a like pair of perforations located proximal to each longitudinal end; a second two-component, rigid support means, substantially identically configured to the first rigid support means, and being positioned adjacent the first support means along a common axis; a second linear bore hole transversing the non-arcuate planar surfaces of the second pair of said support means; an elongate sleeve, located straddling the central linear bore hole, so as to bridge the linear bore holes of the adjacent pairs of support means; two, spherically-faced, flanged, cylindrical bushings, each having one longitudinal end of reduced diameter sized to engage the bore hole of its associated support means, and each having its other longitudinal end forming an inner annular shoulder contacting the planar outer surface of the adjacent clamping component; two washers, each having a bore hole sized to match the fastener diameter; and, an elongate, assembly fastener means of a diameter sized to slidingly traverse both of the clamping means linear bore holes, and also being of a lenght sufficient to extend from one outer surface of the first assembly to the other lateral outer surface of the second assembly, while leaving a projection adapted to engage a removable locking means, thereby to secure the adjacent clamping assemblies about the interlocked two tubings in a variable angle juxtaposition, which angle is adapted to be maintained or adjusted, as needed.

BRIEF DESCRIPTION OF THE DRAWING

FIG. 1A is an exploded view of a first embodiment of the invention, depicting all elements of a single tubing (piping) clamping assembly, which is provided with an optional, large diameter, rigid washer located only at the locking nut end, such washer is adapted to serve as an object support platform; (in a modified version, one spherically-faced washer is omitted and a modified bolt collar is used, which has a spherically-faced mating surface already formed into it;)

FIG. 1B is an assembly view of the first embodiment of the clamping assembly of FIG. 1A, omitting only the locking nut for the threaded bolt end and a tubing usefully to be therein nested;

FIG. 3 shows three alternate juxtapositions for the dual clamping assembly of FIG. 2A (all views omitting the tubular members for clarity) of which: FIG. 3 RTA depicts the clamps oriented to cause any engaged tubular members to present at right angles; FIG. 3 OFF depicts the clamping assembly of the components of FIG. 2A, oriented to have engaged tubular members to be in offset planes which corresponds to the exploded view components of FIG. 2A; and, FIG. 3 PAR depicts the clamp assembly oriented to have any engaged tubular members to be essentially parallel to one another in close proximity, and in substantially the same horizontal plane;

FIG. 4 shows the same three dual clamping assembly juxtapositions as depicted in FIG. 3, but now having the tubular members, in situ, depicting the resulting right angle-, the offset-, and the parallel-orientations, being FIGS. 4 RTA; 4 OFF; and 4 PAR, respectively;

FIG. 5 depicts one longitudinal sectional view of the clamping assembly of FIG. 4 OFF; in particular, another sectional view of that assembly, but with the fastening elongate bolt and locking nut in the operative position;

FIG. 6 is a set of four views (one in vertical sectional) of just one of the paired sets of axial bushings 32, first seen in FIGS. 1 and 2;

FIG. 7 is a set of five views (one longitudinal sectional) of one of the clamped body elements 20 having an approximate, or less than quarter circle, arcuate surface, also first seen in the exploded views of FIGS. 1A and 2A, being arranged in complemental juxtaposition therein;

FIG. 9 is a perspective view of an alternate configuration for an elongate fastener bolt, suitable to replace the standard fastener bolts of FIGS. 1A and 2A;

FIG. 10 is a perspective view (enlarged and partly cutaway) of one of the paired identical bushings of FIG. 1A, depicting its outwardly-facing, concave end surface, being located at the larger diameter, longitudinal end;

FIG. 11 is a cutaway, perspective view (rotated 90° for clarity) of one of the paired washers of FIG. 1A, usefully positioned adjacent the bushing the FIG. 10, depicting its one convex end surface, being located on the side contacting the bushing concave end surface seen in FIG. 10;

FIG. 12 depicts three longitudinal views of the same clamping assembly of FIG. 1A, but now modified to use the elongate fastener bolt, the single concave side bushing, and the single convex side washer of FIGS. 9, 10 and 11, respectively, of which:

FIG. 12A is the tubing assembly shown with a major gap located between the opposing tube support body members, clamped about a tubular member;

FIG. 12B is the same assembly still with an appreciable gap located between the opposing, symmetrical support body members;

FIG. 12C is the same assembly with a minimum gap located between the opposing symmetrical support body members, and conferring the tightest degree of clamping about the enclosed tubular member;

FIG. 13 provides a perspective view (overhead and forward) of an improved clamping assembly employing the operative components depicted in FIGS. 9–1, now bearing a useful accessory (a reel);

FIG. 14S/F are an elevational view of an alternative fastener bolt interchangeable with the bolt depicted in FIG. 9; and FIG. 15S/F are elevational views of another fastener bolt interchangeable with that of FIG. 9.

FIG. 17A is an exploded view of a third embodiment of the invention, depicting all elements of a single tubing clasping assembly, which differs from the embodiment of FIGS. 1A/B, in that the flexible band and two-component tubular support means have been combined into an integrated component, adapted to flex into a U-shaped component suited to engage a nested tubular member (not shown) serving as a support member;

FIG. 17B is an assembly view of the embodiment of FIG. 17A, now using standard locking nuts, depicting the clamping assembly, and now including a tubing member to be retained therein, but now shown in their assembly configuration to better depict the specially configured longitudinal ends provided with landings adapted for recessed bolt and washer nesting upon assembly;

FIG. 17C is a perspective view of the about-to-be conjoined elements of FIG. 17A, which serves to better depict the recessed niches for the special fasteners and assembly bolts;

FIGS. 24S and 24T depict a side elevational and top plan view of an elongate bolt, suitable as the connecting axis for the gripping assembly of FIG. 23S;

FIGS. 25T/A, E, & B, depict an arcuate surface washer showing a shallow rectangular channel provided on one surface that adapts such washer configuration to close seating on an arcuate bolt flange, while FIGS. 25T/B and 25S are a top plan and side elevational view of the same washer rotated 90°; and, FIG. 26 depicts the washer positioned with its arched edges in situ.

DETAILED DESCRIPTION OF PREFERRED EMBODIMENTS

Figure 2A:
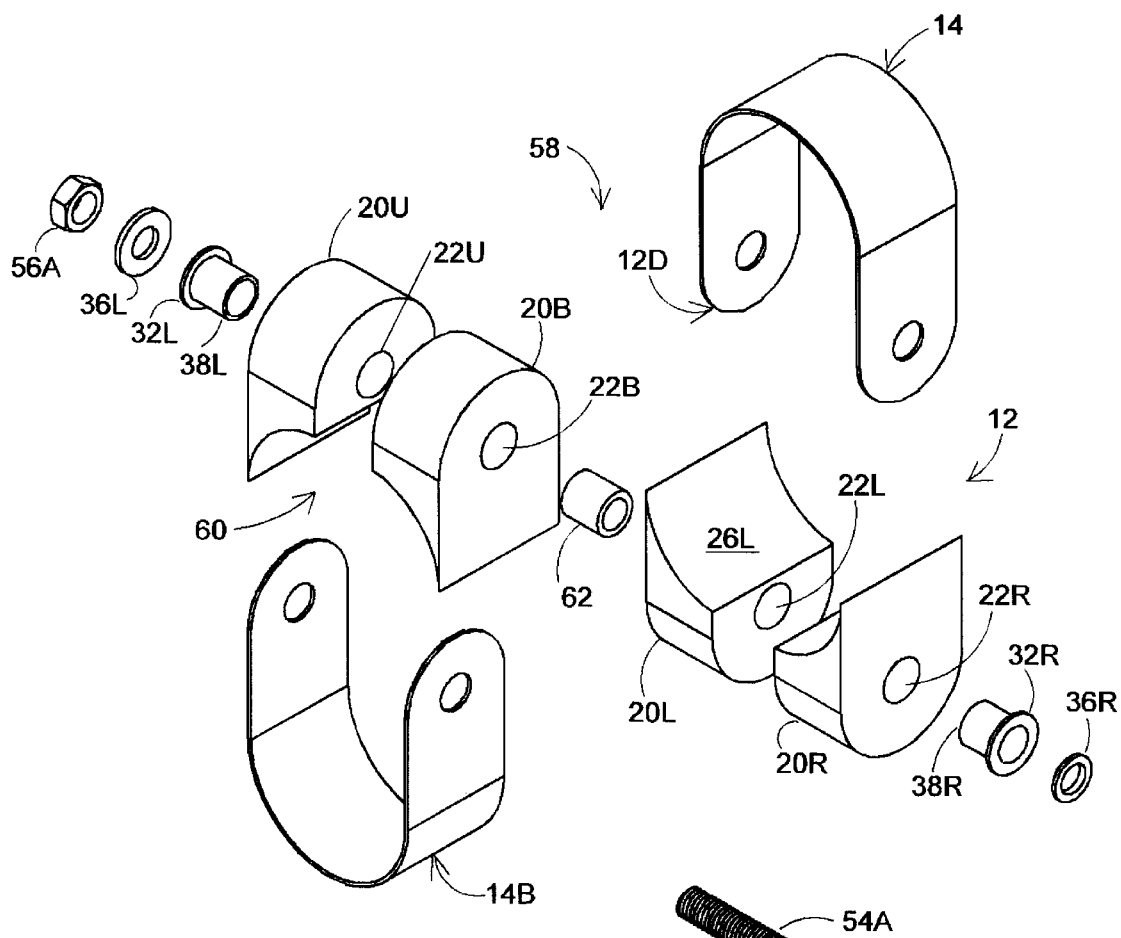
FIG. 2A is an exploded view of a second embodiment of the invention depicting all the elements of a two-tubing, dual clamping assembly, each of which is provided with a matching set of components, save for a single added central rigid collar, that acts to bridge the otherwise identical, but inversely-oriented, paired clamping assemblies.

Referring now to the drawing, and to FIG. 1 in particular, there is presented an exploded view of a first embodiment of the invention, generally 12, comprised of a deformable, flexible band 14 with memory, being generally of a rectangular configuration, and having bevelled longitudinal ends 16L/R. Band 14 is also provided with two circular perforations 18L and 18R, which are proximal to its longitudinal ends, and sized to match the bore holes of its cooperating elements. It is preferably of spring sheet metal, plastic, or composite, such as deformable sheet material of high tensile strength, or may be of other resilient but deformable planar material, like metal, plastics or composite. It may be stamped from sheet stock.

Located beneath band 14 is a pair of structurally identical tube support components 20L and 20R. A single configuration serves as both arms for tubing support by use of a second component being rotated to present the mirror image as shown. Each component (20L/R) has a linear bore hole 22L/R traversing only the planar end wall segments, and is sized to slidingly engage an elongate fastening member, such as a threaded bolt and associated locking nut, to be described.

The upper component segments 24L/R of each component 20L/R are each provided with a uniform arcuate surface 26L and 26R, having a radius corresponding approximately to that of the tubular member (not seen) to be nested. While not essential, the component side walls 28L and 28R may also present, as depicted, a rounded surface, describing a centrally located semicircle 30, connecting with lateral linear side wall segments 24L/R. The clamping components 20L/R can be forged, machined, or molded from engineering plastics or metals, with the plastic material being preferred, for reasons of economy of manufacture, and also for having a minimal tendency to mar the external surfaces of the engageable tubular members (not seen).

Located adjacent the external planar surface 42L/R of support components 20L/R are identical bushings 32L and 32R, each having an outwardly flanged, end section 34L/R, of a diameter comparable to adjacent sealing washer 36L/R, both suited to pass the shank of a fastener means. The inner segment 38R of bushing 34R is sized to engage bore hole 22R of adjacent component 20R, such that inner (annular) planar surfaces 40L/R seat against planar end wall surfaces 42L/R. Bushings 32L/R are provided with an axial bore hole 44 sized to permit side to side shifting of the bolt during the aligning and tightening of the clamp. The materials of construction may be of machined or forged metal.

Located outwardly of bushings 32L/R are spherically faced washers 36L/R, having inner diameters approximating that of bolt diameter 44R of the adjacent bushing 32R. Each of distal-faced (38L) washers have an axial bore hole 46 sized to match that of bolt 54. See FIG. 11 as depicting the foregoing in this cutaway view of modified washers.

In the depicted embodiment, there is further provided a larger diameter (and thickness) washer-like component 48, optionally including a knurled periphery 50 for facile rotation to a desired, fixed takeup position. The tapped central bore hole 52 of knurled rim component 48 is matched to that of the adjacent elements just described.

Lastly, an elongate fastener member 54 is depicted; typically, it is a threaded machine bolt, conveniently having a hexagon head, and is adapted to traverse the axially aligned elements just described. It is to be secured at its opposing free end by a standard locking nut 56.

When assembled for tube engagement and clamping, the operative appearance of the single assembly 12, is as seen in FIG. 1B, (which omits only the locking nut 56, and the tubular member, also not seen).

FIG. 2A is an exploded view of dual-clamp assembly component 58 (like those of FIG. 1), except that a structurally identical clamping assembly, generally 60, is aligned to be conjoined axially with the first assembly 12 (FIG. 1B). The added components are: inverted flexible band 14B, inverted support components 20U and 20B, and rigid, internal sleeve member 62, along with depicted reverse position for fastening bolt 54A and its associated locking nut 56A. Only the knurled rim washer 48 of FIGS. 1A and B is omitted in this arrangement. Sleeve 62 is a pipe-like, linear member which is located straddling the to-beconjoined linear bore holes (22L/R and 22U/B) of members 20L/R and 20U/B, by virtue of which linking position, it aligns and maintains the dual clamping assemblies 12/16 in proper position while being subjected to bearing loads, to be described. Sleeve 62, because of imposed shearing stresses from the supported tubular members, is preferably made of machined or fabricated metal. The sleeve is useful, but not an essential element.

When all components of both assemblies 12/16 are conjoined in the functional mode, they appear as assembly 58A, as depicted in FIG. 3 OFF (offset). By a 180° rotation of assembly 60, it assumes the relationship shown in FIG. 3 PAR (parallel). Lastly, by only a 90° rotation, from either of the position of FIG. 3 OFF, or of FIG. 3 PAR, the assemblies then present the angular relationship of FIG. 3 RTA. The three clamping positions depicted are first arranged loosely to embrace and cross connect tubular members, as will be shown in FIG. 4, and then tightened to the operative mode.

In FIG. 4 OFF, the dual assemblies interlock of tubular members 70H and 72H are seen in the offset parallel position. The mounting of the loosely held assembly components were conducted about members 70H and 72H, once their relative positions were determined. It will be readily apparent that a plurality of members, such as 70/72, can be arranged in any one of the depicted interconnect modes or to create a framework having a variety of configurations (not seen). FIGS. 4 PAR and 4 RTA, correspond to FIGS. 3 PAR and 3 RTA, respectively.

Another perspective of the inventive clamping assemblies, as in the dual unit configuration, are shown in the longitudinal and view of FIG. 5. This view depicts the same assembly as FIG. 4 OFF, also with both end fasteners 54H and 56 seen in their locking position.

In FIG. 6, there is shown the inwardly projecting end 38R of a bushing 32R, its spherically concave surface 34R, the elevational view of projection 38R, and a longitudinal sectional view showing bore 44, from each longitudinal end.

Figure 8:
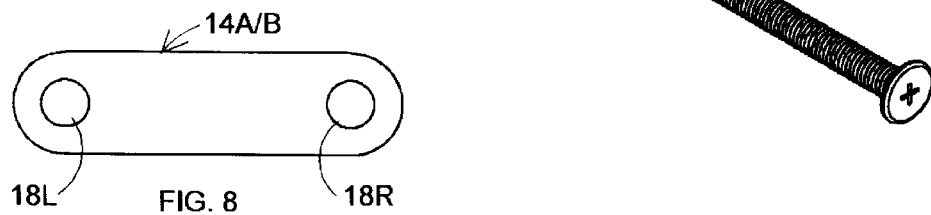
FIG. 8 is a top plan view of the flexible and resilient but deformable band (strap) seen in its undisturbed planar configuration, used in the assemblies of FIGS. 1A and 2A.

In FIG. 7, there are depicted plural views of the clamping components 24L or 24R, of which 26R is the inward facing arcuate surface; 42R is the outward facing planar surface, and 30P is the rounded bottom of the assembly component; and In FIG. 8 there is depicted a resilient clamping band 14A/B in its undistended state. The band may be modified to provide an upstanding but narrow collar around the perimeter of each band perforation, in one planar face (not seen).

Referring now to the bolt 76 of FIG. 9, it is provided with a threaded section 76U and 76L at each longitudinal end, with the intermediate segment 76S (shank) being smooth-surfaced, as by forming. Proximal to the longitudinal end 76U, is provided an integral, radially-projecting collar section 77F, having a diameter about twice that of the shank of bolt 76. The collar component 77F is conveniently provided with two flattened segments (cutaway chords) 77U and 77L, diametrically opposed, which facilitates the alignment and anchoring of bolt end 76U, during component mounting. When in use, the bolt 76 appears as in the FIGS. 12A/B/C, with the flanged collar end 76U being presented uppermost. Tightly adjacent the planar underside of 77P of bolt 76 is located the planar surface of a washer 66 of FIG. 11. The flanged shoulder 77F of bolt 76 provides a platform for the mounting of various accessories, by an attachment means of some type, which then requires only a standard nut (seen on the other bolt end), to secure an accessory (not seen) to that upper end of the clamping assembly 12M. At the other longitudinal end 76L of bolt 76, another standard nut 68L is used to retain the entire assembly about the tubing, as depicted.

In the perspective view of FIG. 10, an axial quadrant has been cut away from bushing 32R (FIGS. 1& and 2A) to reveal its internal configuration. The axial bore 44M is sized to admit the shank of bolt 76 (FIG. 9) with clearance side to side for clamp alignment while tightened (See FIGS. 12A/B/C). The inwardly facing flanged planar surface 70 of the collar is annular, (ring-like) while the outwardly facing surface 72 presents a peripheral ledge 74, centered about a shallow recess 76, which recess itself is in the shape of a concave surface.

Concave surface 76 is complemental in its curvature to the opposing convex surface 78 of adjacent washer 66 (FIG. 11). The obverse side 64 of washer 66 is substantially planar.

The manner of seating of bushing 32M and washer 66 is seen in the vertical partial sectional view of FIG. 12A of a clamping assembly 12M. The inner shoulder 70 of bushing 32R seats tightly against the one longitudinal end 14U of clamp strap 14 (compare FIG. 1A) which it traverses.

As a result, upon the inclusion of a mounted accessory (such as seen in FIG. 1B) on the flanged bolt end 76U, this isolates that accessory mounting step from the manner and degree of tightening required by the assembly itself about tubular member 14. Rather, the clamp assembly 12 tightness is solely a function of the take-up position of lower end nut 68L in FIGS. 12A/B/C.

Similarly, the lower set of bushing washer mating, are retained in place by the shoulder 77P of collar 77, located at the other longitudinal end of the assembly.

In the elevational view of the modified clamping assembly of FIG. 12A, with tubular member 72 in a locking position, it will be seen that the side gap between the opposing support bodies (26U/26L) varies from FIGS. 12A to 12C, and is directly proportional to the degree of take-up of lower end bolt 68. Also, the alignment of the bolt shank 60S within the elongate bore hole 74 is defined by the assembled components and will vary with the degree of end nut take-up. In FIG. 12A, where gap 79A is widest, the bolt shank is shifted to the right side of the bore hole 74. In the next view of FIG. 12B, the reduced gap 79B, and the same bolt shank is essentially central of the elongate bore hole 74.

The clamping strap 14 (FIG. 1A), is biased even tighter around the tubular member 72 by the positioning of end bolt 68; while the opposing concave/convex component surfaces of the pairs of bushings/washers facilitates the bolt lateral shift within the elongate bore hole.

In the third view of FIG. 12C, gap 79C is reduced to a minimum, so that the support bodies 26U/26L have moved even closer, compelling the bolt shank 76 located within bore hole 74, to exert the greatest binding effect on the tubular member, which shift is again facilitated by the complementally configured opposing surfaces of the paired bushing/washers.

In the perspective view of FIG. 13, there is depicted how the modified assemblies of FIGS. 12 (12B), may concurrently engage and retain both a tubular member and a separate accessory, via the cooperation of such the modified components of FIGS. 9, 10 and 11. In this view, a freely-rotating reel 80, having a peripheral channel 82 (a functional pulley), has been mounted on the flange-bearing (platform) end 77P of the modified bolt 76 of FIG. 9. Right side washer 66 abuts the inward surface of flanged collar 77F, while the axis of reel 80 itself abuts the opposing (platform) surface 77P of flange-like collar 77F.

It will be clear that the axial retention and the mobility of reel 80 is controlled only by the degree of take-up of its own end-nut 68U; it is thusly not inhibited by the degree of tightness required for the entire clamping assembly (FIG. 12B) about tubular supporting member 70M.

Clearly, a variety of other accessories can be handily secured to the platform end 62L of assembly 12M. It serves a number of purposes to those skilled in the art of erecting devices of tubular interlocked components.

In FIGS. 14S/F are depicted an alternate configuration for the elongate bolts shown and described in connection with the improved assembly fastener bolt of FIG. 9. Bolt 90 provides a lower end 90L has threaded segment 92 adapted for securing through the clamping assembly 12 of FIG. 1A. The opposing bolt longitudinal end, 90U, with its proximally located flanged collar 94, is adapted for mounting accessories, such as reel 80, as seen in FIG. 13. By inclusion of a convex lower surface 96 integral with collar 94, this precludes the need for the convex surface washer 66, such as that depicted in FIG. 11. The flattened segments 94L and 94R of collar 94, as depicted in FIG. 14F, facilitate bolt alignment, as with bolt 76 of FIG. 9. There, planar surfaces 94L/R serve to provide a gripping platform for a wrench jaws (not seen), when a nut is being torqued at either end of fastener bolt 14S/F, and prevents rotation of the bolt 90 itself.

The second alternative fastener bolt 90A of FIGS. 15S/F is like that of FIGS. 14S/F, except for the configuration of its collar component 94O, which presents a substantially ovular periphery. The diametrically opposing edges 96L/R of collar 94O are flattened more substantially, providing the somewhat ovoid configuration for planar surface 94P. Again, the undersurface 96O of the modified collar 94O is provided with a convex undersurface 96U obviating a washer 66 need.

Figure 16:
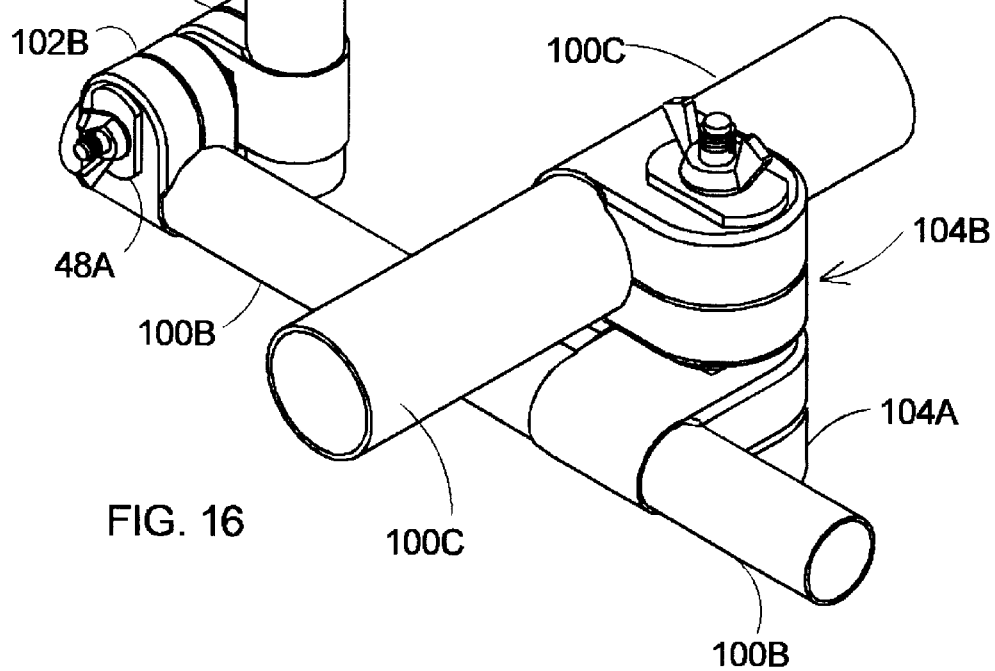
FIG. 16 is a perspective view of a clamping assembly employing the cooperating dual elements first depicted spatially in FIG. 2A above, but now with each of the dual two tubing assemblies shown comprised of two differently sized clamping assemblies serving for interconnection of rounded tubing members at right angles having substantially differing diameters.

In the perspective view of FIG. 16, the clamping assemblies of FIGS. 1A and 3RTA are depicted now as the interconnections of three linear tubings 100A, 100B, and 100C, of two varied diameters. Monotube assembly 102A is mounted upon tubing 100A. The two tubing, dual clamping assembly 102B interconnects vertical tubing 100A and like diameter horizontal tubing 100B, with the associated assembly 102B being of the same general dimensions for its components as for those in assembly 102A. Dual clamping, assembly 104A/B is of differing dimensions, thus permitting the interconnection of lesser diameter tubing 100B with larger diameter tubing 100C, by the use of smaller assembly 104A and axially tied larger assembly 104B. This dual tube clamping is like the assembly juxtapositions displayed in FIG. 3RTA, but which omits the tubings for clarity of view.

In the exploded view of FIG. 17A, a segment of tubular member 110 is seen offset from the single clamp component, generally 112, to be described, which will comprise upon assembly, an interruptible connector assembly for the interlocking spatially of one tubular member 110 with another fastener-end mounted object (not shown). Assembly 112 comprises an integral, single gripping means 114, normally of an elongate generally rectangular configuration, with an outer surface 116 being generally planar when at rest, but presently depicted in its more useful U-shaped configuration, defining a circular chamber 116C. Such gripping means 114 has two identically-configured longitudinal ends, 116L and 116R, with each such end comprising an enlarged flange, generally, 118L and 118R, of a variable width, tapering from a narrower transverse outer edge 120 to an appreciably wider transverse and arcuate inner edge 122L/R. A transverse bore hole 124L is located centrally within the flanged end 118L and bore hole 124R is located within flanged end 188R. A partial counterbore hole 126L (generally rectangular) is centered on bore hole 124L, and a partial counterbore (not seen) on hole 124R, both being offset from the arched portion of outer smooth surface 116. Disposed interconnecting the flanged ends 118L/R is an elongate intermediate section 116 I having its inner smooth surface ends, terminating in arcuate segments 122L and 122R, that are coincident with the wider inner edges of enlarged flanges 122L and 122R.

An elongate assembly fastener means 130 is threaded at both longitudinal ends, 130I and 130O, and traverses means 112. Fastener means 130 is of a diameter sized to slidingly traverse the axially aligned bore holes 124L and 124R, and is further provided with an integral circular collar 132, located intermediate of, but proximal to, the one fastener means end 130O. Intermediate collar 132 serves as a retaining washer, as will be shown. A single arcuate-surfaced washer 134, suitably bored, is located adjacent the counter bore 126R of flanged end 118R. A pair of wing nuts, 136L/R and collar 132, will serve as the assembly locking means, one for each end, and are sized and tapped to engage fastener means 130. They also serve to hold the assembly 112 firmly about tubular member 110, and as well, on any component (not shown) hung on the shorter free end 130O of fastener 130.

In the enlarged perspective view of FIG. 17B, all of the elements described in relation to FIG. 17A, have now been combined, such that the gripping means 112 is firmly mounted on horizontal tubing 110 with left hand, wing nut, 136L, clasping special planar-faced collar 132, which could serve as a mounting sidewall for any depending object (into seen).

In the reverse angle, perspective view of FIG. 17C, the elements of the monoclamp assembly of FIG. 17A are depicted, including tubing 110, double-wing U-shaped, resilient gripping component 112, flanged elongate bolt 130, arcuate end washer 134 and dual locking nuts 138L/R. The functional result is as depicted in FIG. 17B. The open longitudinal end of threaded bolt 130 is provided for the optional mounting of an accessory (not shown).

Figures 18A, 26:
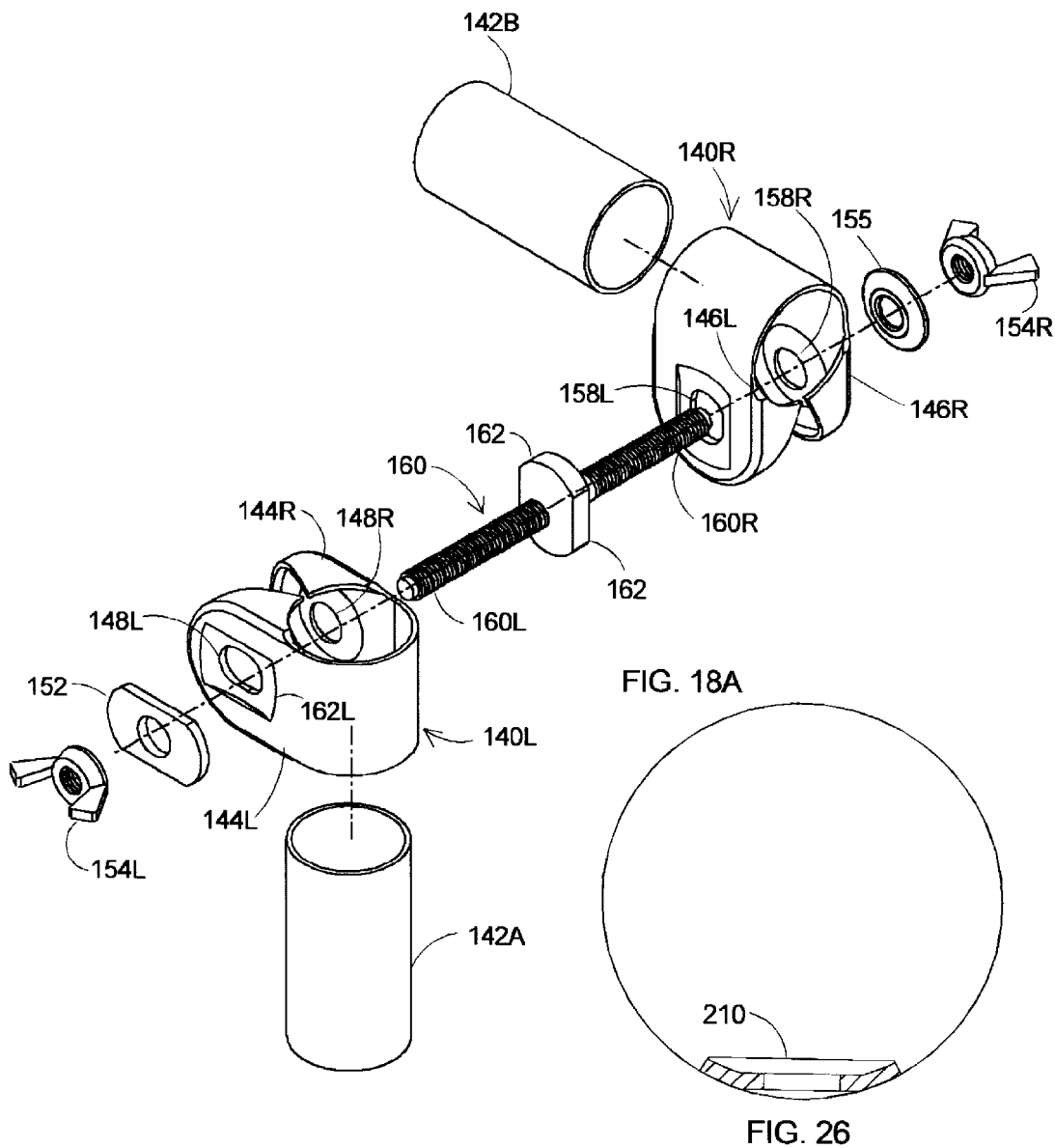
FIG. 18A is an exploded view of a fourth embodiment of the invention depicting the elements of a two-tubing, dual clamping assembly (isolating the paired tubings themselves for clarity), each of which is provided with a matching set of components, except for a single, adjustable position, fastener bolt that serves to abut the otherwise identical, but inversely oriented pair of clamping assemblies.

In the exploded view of FIG. 18A, dual gripping assemblies, generally 140L and 140R, are positioned axially prior to mounting on their respective vertically-disposed tubing 142A and horizontally-disposed tubing 142B. Horizontally oriented gripping component 140L is sized and configured just like its counterpart in FIG. 17A, having arched sidewalls 144L/R, and 146L/R, complemental countersunk boreholes 148L/R and 150L/R, a generally rectangular washer 152, and companion wing nut 154L.

Similarly, vertically oriented gripping component 140R has arched sidewalls 146L and 146R, complemental countersunk bore holes, 158L/R and 158R, circular inner surface, rounded washer 153L and other end wing nut 154R.

A somewhat differing configuration for the assembly fastener means, 160, is employed here. Linear rod 160 has an intermediate integral rounded flange 162, disposed substantially centrally thereof. The longitudinal ends are suitably threaded, 160L/R, and provide the axial mounting points for the dual gripping members, washers, and wing nuts. Note that the countersink 162L on one bore hole 148L, is generally rectangular, while the opposing countersink bore hole 158R; on sidewall 146R is generally circular. As in FIG. 17B, left hand, planar-surfaced washer 152 presents a mounting sidewall for any depending object (not shown).

Figure 18B:
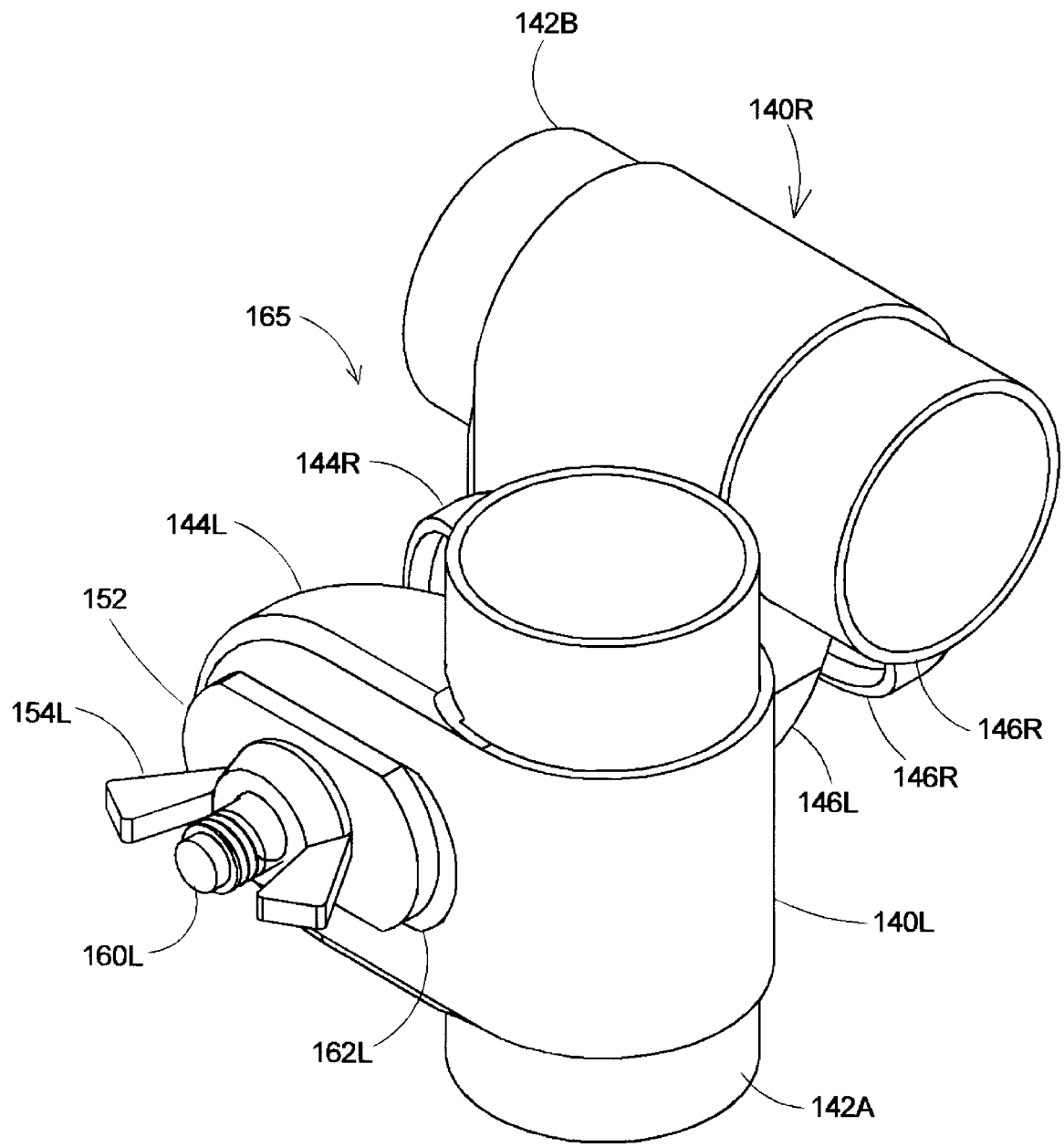
FIG. 18B is an assembly view of the embodiment of FIG. 18A (broken away from a configuration like that of FIG. 16), depicting a clamping assembly and now engaging two tubings so as to present them at optional right angles.

In the enlarged perspective view of FIG. 18B, all of the elements described in relation to FIG. 18A have now been combined into an interlocking tubes assembly 165. This dual tubes interlocking can be extended to added tubing segments as will be described.

Figure 19:
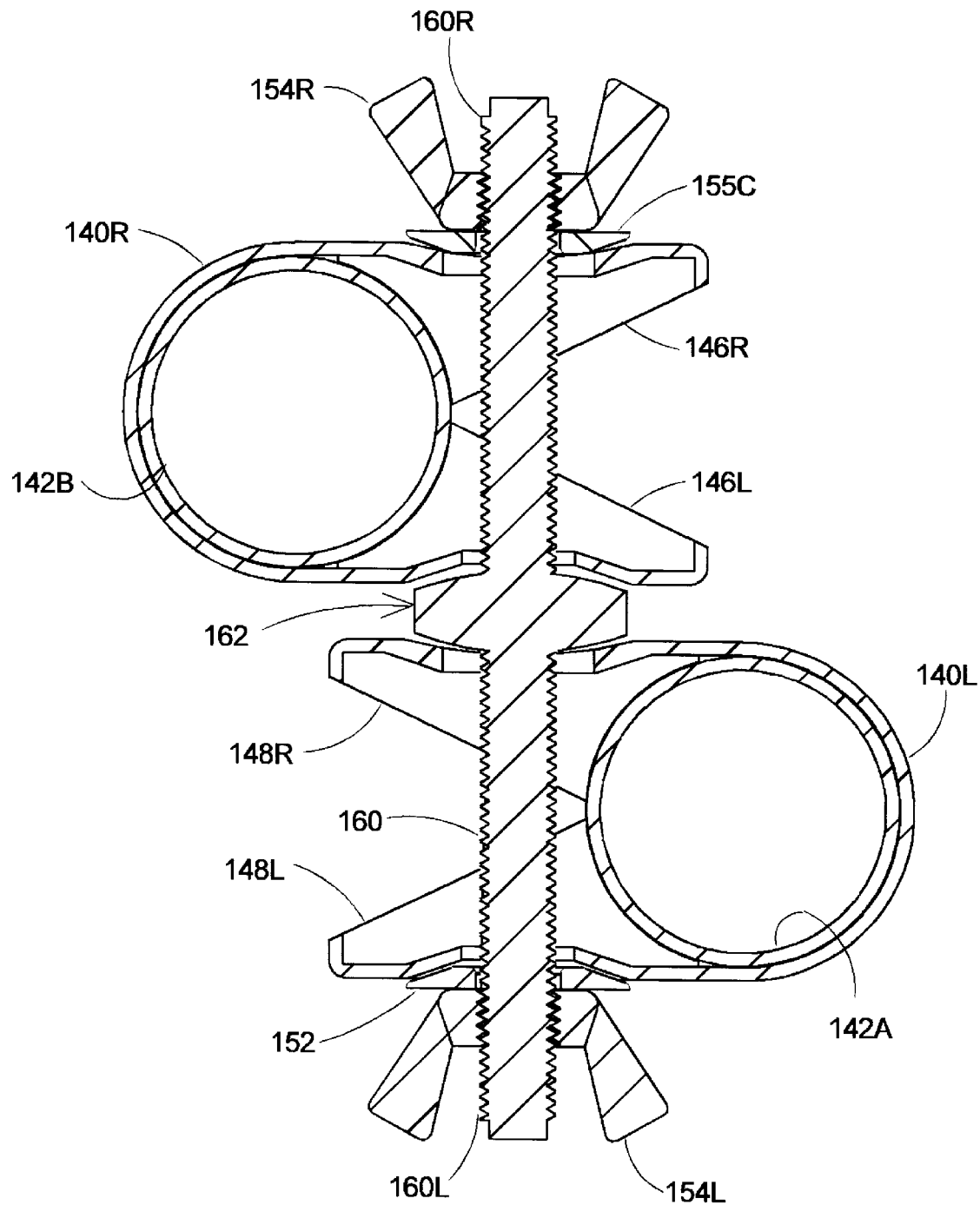
FIG. 19 shows one vertical sectional view of the clamping assembly of FIG. 18B, with two tubings engaged therein, but now right aligned in parallel, and retained in place by elongate fastener bolts and backing wing nuts seen in their operative positions.

In the vertical sectional view of FIG. 19, the dual connected tube assembly of FIG. 18B has been rotated 90°, counter clockwise, about its elongate fastener 160, such that interconnected tubings 142A and 142B are now in an offset but parallel array, much like that depicted in FIG. 3 OFF. All of the gripping elements described in relation to FIG. 18A are seen in their functional array, which firmly grips both tubings, while providing optional mounting platforms at the opposing longitudinal ends of the entire assembly.

Figure 20:
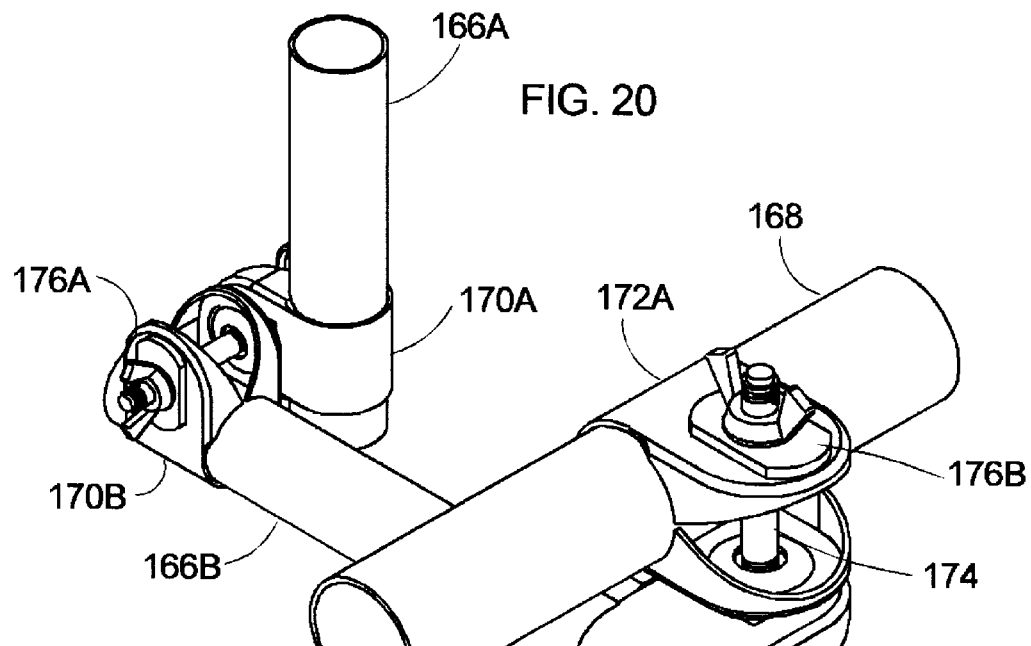
FIG. 20 is a perspective view depicting the use of the clamping assembly of FIGS. 18A/B, in which three tubular members of two differing diameters are interconnected at right angles, and the elongate fastening bolt of the single tubing clamping assembly presents a threaded stanchion, useful as a mounting point for other objects.

In the perspective view of FIG. 20, a three tube interconnection, much like that of FIG. 16, is depicted, but with the plural element gripping components of FIGS. 2 to 3, supplanted by the paired integral gripping means 140L/R of FIG. 18A. The gripping assemblies of FIG. 20 depict interconnections of three linear tubes, 166A/B, and the larger diameter tubing 168. Monotube gripping assembly 170A is mounted on vertical tubing 166A. The two tubing, dual clamp gripping assembly 170A/B interconnects vertical/horizontal tubings 168 and 166B. The gripping assemblies, 170A/B, 170C, and 172A are all of the same overall dimensions, while assembly 172A is appreciably larger, so as to snugly seat about the diameter of larger horizontal tubing 168. This common axial mounting on elongate fastener 174 of assemblies 170C and 172A, provides a means for interconnecting securely of variably diameter tubings.

As noted, either of planar surface to washers, 176A/B present sidewalls for mounting of other objects (not seen).

Figure 21T:
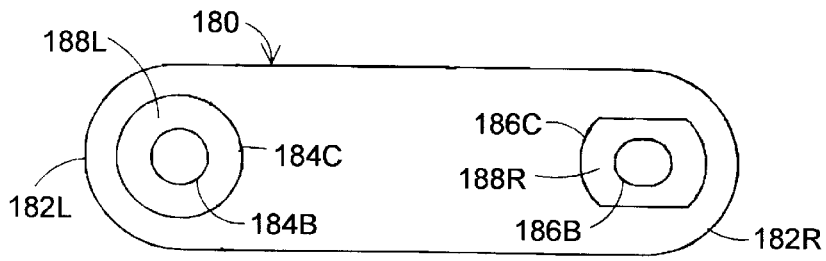
FIGS. 21T, 21S, and 21B are top plan, side elevation and bottom plan views, respectively, of the undistended main tube gripping component of the embodiments of FIGS. 17A and 18A.

The gripping components of FIGS. 17 and 18 (components 112 and 140, respectively) are depicted in FIGS. 21T/S/B. The planar configuration depicts how gripping component 180, of an elongate linear configuration, with rounded longitudinal ends 182L, 182R, is normally seen and presents, as it is fabricated from selected materials of construction. Proximal to longitudinal end 182L is circular bore hole 184B and circular countersink 184C. Proximal to the other longitudinal end 182R is a generally circular bore hole 186B and companion truncated circular countersink 186C, which provide a spherical landing 188L and a modified spherical landing 188R, respectively, in FIG. 21.

Figure 21S:
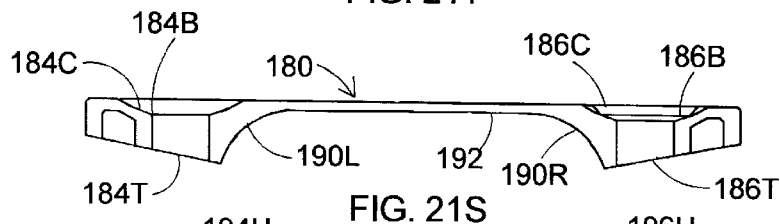
Figure 21B:
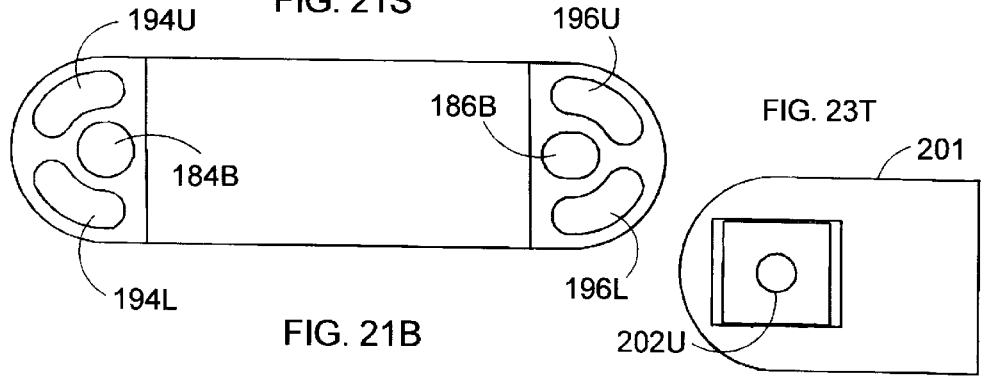

In the FIG. 21S side elevation view, the tapered nature of the gripping means end flanges 182L/R is made more apparent. The outer vertical rims are linear while the inner rims, 190L/R, are arcuate and coincide with the longitudinal ends of the planar flexible interconnecting segment 192. Note the wide outer surface, countersinks 188L and 188R for each of the traversing bore holes. The gripping means bottom view of FIG. 21B depicts a pair of arcuate recesses, 194U/L, within flanged end 182L, and like recesses, 196U/L, in flanged end 182R, which recesses serves to even out the wall thickness of the part. This is a feature added to plastic parts during their manufacture to minimize "hollows" created when thick plastic parts shrink as they cool from their previous liquid state which is that prevailing during injection into the mold cavity. It is within the skill of the are to have the gripper component fabricated of resilient materials in a plurality of sizes, so as to accommodate the nesting of tubings of varied diameters.

Figures 22E, 22S:
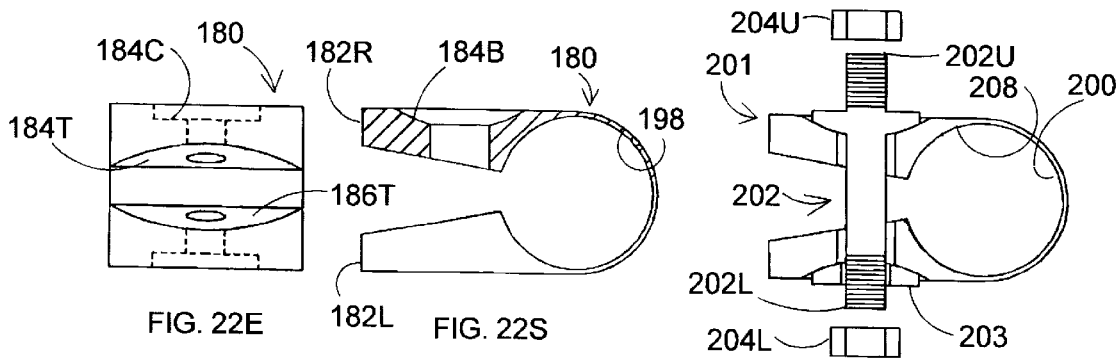
FIGS. 22S and 22E depict a partial vertical sectional and top elevational views of a gripper component of FIG. 21, depicting the complemental ends bolt and with flanged surfaces and gripping member recessed landings.

In the side elevation views of FIG. 22S, the gripping component 180 of FIG. 21S has been folded back to the U-configuration that would receive a tubing (not shown), but also one in which bore holes 184B and 186B are axially aligned, so as to receive an elongate bolt (such as the one as in FIG. 17). The open-end view of the folded gripper component 180 is depicted in FIG. 22E.

Figure 23T:
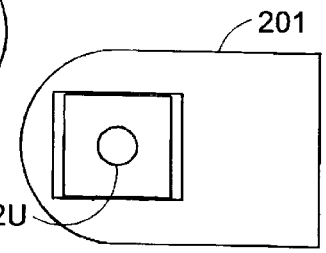
FIG. 23T depicts a top plan view of the assembly of FIG. 23S.

In the side assembly view of FIG. 23, the component 180 of FIG. 22S has been mated with a tubing 200, an off-center, collared bolt 202, spherical washer 203 and locking nuts 204U and 204L. Assembly 201 tubing contact is tightened from the bottom longitudinal end (nut 204L) about the tubing 200. The threaded upper segment, 202U, will serve to support another fixture (not seen), being held securely by upper nut 204U. FIG. 23T depicts a top plan view of assembly 201.

Figure 23S:
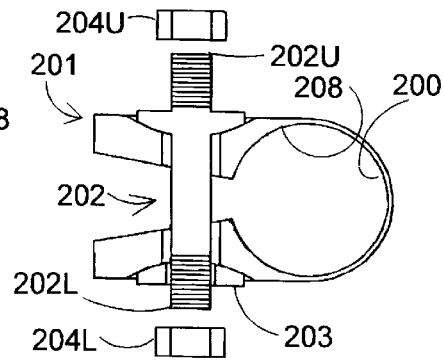
FIG. 23S depicts a partial vertical sectional view of the component of FIG. 22S showing both the elongate fastener, arcuate washers, and standard end nuts, as seen in the perspective view of FIG. 17C.

The flanged bolt 202 of FIG. 23S is also depicted in the side elevational view of FIG. 24S, and the top plan counterpart view of FIG. 24T. The uniform curvature of flanged inner surface 208 is of a circle of a preset radii, and falls well within the skill of the machining arts. The recessed washer landings and arcuate-edged flanges serve to minimize snagging points on the erected multiple tubing assemblies.

In the three views of FIGS. 25A/E/B, the top, edge, and bottom view of a specially-configured washer 210 are depicted. Holed washer 210 has upwardly flared lateral ends, 212L/R, and an intermediate annular planar surface 214. Central bore hole 216 is provided for fastener mounting. The essentially circular periphery washer 210 has parallel truncated edges 215L/R. The offset inclined lateral segments 212L/R correspond to segments of a circle (not seen) having a radius that is readily determined by those skilled in the art.

In the related views of FIGS. 25T/B and 25S, washer 210 has been rotated 90° to present its other peripheral dimensions. In the side elevation view of FIG. 26, the means of determining the radius of the phantom circle circumscribed about the external ledges of seated washer 210 of FIG. 25S, is depicted.

These and other advantages will be apparent from a study of the appended claims. It is to be understood that the invention is not intended to be restricted to the recited aspects of the above embodiments which, are described by way of example only.

What is claimed is:

1. An interruptible connector assembly adapted to provide for spatial interlocking of one tubular member with another object to be supported thereupon, comprising;

(a) an integral, single component gripping means of an elongate, generally rectangular configuration, having opposing first and second surfaces with one other surface being generally planar and the other surface having substantially identically-configured longitudinal ends, each of which comprises;
- (i) each longitudinal end comprising an enlarged flange of variable width, tapering from a narrower external transverse edge to an appreciably wider arcuate transverse inner edge;
- (ii) a transverse bore hole located centrally of the each tapered flange;
- (iii) a partial counter bore centered on the bore hole from the planar outer surface of each said flange and tapered inwardly therefrom;

(b) an elongate intermediate segment located interconnecting the flanged ends of the gripping means, being generally planar with its longitudinal ends being provided with arcuate edged lateral sidewalls that are coincident with the arcuate inner edges of the enlarged flanges;

(c) an elongate assembly fastener means of a shaft diameter sized to slidingly traverse the axially-aligned, bore holes of the gripping means while said gripping means is conformed to a U-shaped position, and the shaft diameter further provided with an integral, radially-projecting, collar component located intermediate of, and proximal to, one of the fastener means longitudinal ends, serving as a retaining sidewall;

(d) an arcuate surface washer, having an axial bore hole sized to receive the shaft diameter shaft of the elongate fastener means; and, (e) a pair of assembly locking means, one for each said fastener means longitudinal end, with one locking means serving to lock one flange of the gripping means while mounted about a tubular member, and the other locking means serving to lock the other flange of the gripping means and any depending component optionally mounted on the other free end of the fastener means.

2. The assembly of claim 1 wherein the opposing pair of flanged ends of the U-shaped gripping means present a substantially cylindrical channel of a radius sized to nest the tubular member to be interlocked therewith.

3. The assembly of claim 1 wherein the assembly fastener means is a rigid linear bolt having take-up threading sections provided for an appreciable length extending to each longitudinal end thereof.

4. The assembly of claim 2 wherein the integral collar component is provided with a pair of flattened sections on its periphery, diametrically opposed, and comprising substantially parallel, linear edges.

5. The assembly of claim 1 where the fastener means collar component is provided with at least one arcuate surface complemental of its adjacent counter bore of the gripping mean.

6. The assembly of claim 1 wherein the washer is provided with one normally planar surface and obversely with a projecting surface in the shape of a convex surface centered on its axial bore hole, which convex surface is complemental in its curvature to a concave surface of outwardly facing surface of the adjacent flange.

7. An interruptible connector assembly adapted to provide for spatial interlocking of two tubular members that are to cooperate and which assembly can be rotationally adjusted to provide variable angular deviations of one tubular member from the other tubular member, comprising;
- (a) a pair of integral, single component gripping means, axially-aligned, with each such pair comprising an elongate, generally rectangular configuration having opposing first and second surfaces with one surface being generally planar and the other surface having substantially identically-configured longitudinal ends, each of which comprises;
    - (i) each longitudinal end of the gripping means comprising an enlarged flange of variable width, tapering from a narrower external transverse edge to an appreciably wider arcuate transverse inner edge;
    - (ii) a transverse bore hole located centrally of each tapered flange;
    - (iii) a partial counter bore centered on the bore hole from the planar outer surface of each said flange and tapered inwardly therefrom;

(b) an elongate intermediate segment located interconnecting the flanged ends of the gripping means being generally planar with its longitudinal ends being provided with arcuate lateral sidewalls that are coincident with the arcuate inner edges of the enlarged flanges;

(c) an assembly fastener means sufficiently elongate to span and conjoin axially each of the pair of gripping means, and of a shaft diameter sized to slidingly traverse the axially-aligned bore holes of the pair of gripping means, while the gripping means is conformed to a U-shaped position, and further provided with a radially projecting, integral collar component located intermediate of the fastener means longitudinal ends, serving as a retaining detente for each of the adjoining gripping means;

(d) a pair of arcuate surface washer components, one for each said fastener means longitudinal end, having an axial bore hole sized to threadingly receive the shaft diameter of the fastener means; and, (e) a pair of assembly locking means, one for each said assembly fastener means end, with each of the locking means serving to lock one of the gripping means while mounted about a tubular member, and one of the other locking means further serving to lock any component mounted on the other free end of the fastener means.

8. The assembly of claim 7 wherein the fastener means is adapted to serve as a pivotable axis for effecting any desired angular deviation between the clamped tubular members one from the other.

9. The assembly of claim 7 wherein the assembly fastener means comprises a rigid linear bolt having take-up threading sections provided for an appreciable length extending to each longitudinal end thereof.

10. The assembly of claim 7 wherein the integral collar component is provided with a pair of flattened sections on its periphery, diametrically opposed, and comprising substantially parallel, linear edges.

11. The assembly of claim 7 wherein each washer component is provided with one normally planar surface and obversely with a projecting surface in the shape of a convex surface centered on its axial bore hole, which convex surface is complemental in its curvature to a concave surface of the adjacent flange.

12. The assembly of claim 7 wherein the opposing pair of flanged ends of the U-shaped gripping means present a substantially cylindrical channel of a radius sized to nest one of the tubular members to be interlocked therewith.

13. The assembly of claim 7 wherein the fastener assembly means collar component is provided with at least one arcuate retaining sidewall surface complemental of its adjacent counterbore.

14. An connector assembly adapted to provide for interruptible spatial interlocking of one tubular member with another object to be supported thereupon, comprising;

(a) an integral, single component gripping means having an elongate, generally rectangular configuration, having opposing first and second surfaces with one other surface being generally planar and the other surface having substantially identically-configured longitudinal ends, each of which comprises;
  (i) an enlarged flange of variable width, tapering from a narrower external transverse edge to an appreciably wider arcuate transverse inner edge;
  (ii) a transverse bore hole located centrally of the each tapered flange;
  (iii) a partial counter bore centered on the bore hole from the planar outer surface of each said flange and tapered inwardly therefrom; and (b) an elongate intermediate segment located interconnecting the flanged ends of the gripping means, being generally planar with its longitudinal ends being provided with arcuate edged lateral sidewalls that are coincident with the arcuate inner edges of the enlarged flanges; whereby an elongate assembly fastener means of a shaft diameter sized to slidingly traverse the axially-aligned, bore holes of the gripping means while said gripping means is conformed to a U-shaped position, with the fastener means longitudinal ends, serving as a retaining sidewall.

* * * * *